(12) United States Patent
Hoehne et al.

(10) Patent No.: US 10,915,786 B2
(45) Date of Patent: Feb. 9, 2021

(54) OBJECT DETECTION AND CANDIDATE FILTERING SYSTEM

(71) Applicant: SAP SE, Walldorf (DE)

(72) Inventors: Johannes Hoehne, Berlin (DE); Anoop Raveendra Katti, Berlin (DE); Christian Reisswig, Berlin (DE); Marco Spinaci, Berlin (DE)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 16/288,357

(22) Filed: Feb. 28, 2019

(65) Prior Publication Data
US 2020/0279128 A1  Sep. 3, 2020

(51) Int. Cl.
*G06K 9/62*  (2006.01)

(52) U.S. Cl.
CPC ..................... *G06K 9/623* (2013.01)

(58) Field of Classification Search
None
See application file for complete search history.

(56) References Cited

U.S. PATENT DOCUMENTS

| | | | |
|---|---|---|---|
| 9,208,377 B2* | 12/2015 | Mizuno | G06K 9/00369 |
| 9,294,753 B2* | 3/2016 | Lee | H04N 13/189 |
| 10,157,331 B1* | 12/2018 | Tang | G06K 9/6231 |
| 10,380,853 B1* | 8/2019 | Solh | G06K 9/00362 |
| 10,425,603 B2* | 9/2019 | Kostrzewa | G06T 5/20 |
| 10,445,567 B2* | 10/2019 | Zhang | G06T 7/11 |
| 10,503,985 B2* | 12/2019 | Gokan | G01S 7/411 |
| 10,565,473 B2* | 2/2020 | Tang | G06K 9/2054 |
| 2010/0329588 A1* | 12/2010 | Cheatle | H04N 1/3872 382/298 |
| 2013/0148880 A1* | 6/2013 | Kennedy | G06K 9/62 382/159 |
| 2016/0028921 A1* | 1/2016 | Thrasher | H04N 1/40012 358/519 |

(Continued)

OTHER PUBLICATIONS

Zhou, Xingyi, Jiacheng Zhuo, and Philipp Krahenbuhl. "Bottom-up object detection by grouping extreme and center points." Proceedings of the IEEE Conference on Computer Vision and Pattern Recognition. 2019. (Year: 2019).*

(Continued)

*Primary Examiner* — Michelle M Entezari
(74) *Attorney, Agent, or Firm* — Sterne, Kessler, Goldstein & Fox P.L.L.C.

(57) ABSTRACT

Disclosed herein are system, method, and computer program product embodiments for providing object detection and filtering operations. An embodiment operates by receiving an image comprising a plurality of pixels and pixel information for each pixel. The pixel information indicates a bounding box corresponding to an object within the image associated with a respective pixel and a confidence score associated with the bounding box for the respective pixel. Pixels that do not correspond to a center of at least one of the bounding boxes are iteratively removed from the plurality of pixels until a subset of pixels each of which correspond to a center of at least one of the bounding boxes remains. Based on the subset, a final bounding box associated with each object of the image is determined based on an overlapping of the bounding boxes of the subset of pixels and the corresponding confidence scores.

11 Claims, 5 Drawing Sheets

(56) References Cited

U.S. PATENT DOCUMENTS

| | | | |
|---|---|---|---|
| 2016/0063721 A1* | 3/2016 | Nakano | G06T 7/168 |
| | | | 382/173 |
| 2018/0121762 A1* | 5/2018 | Han | G06K 9/4671 |
| 2018/0157939 A1* | 6/2018 | Butt | H04N 21/466 |
| 2019/0057507 A1 | 2/2019 | El-Khamy et al. | |
| 2019/0171905 A1* | 6/2019 | Ye | G06K 9/6211 |
| 2019/0180443 A1* | 6/2019 | Xue | G06K 9/6209 |

OTHER PUBLICATIONS

Danelljan, Martin, et al. "Atom: Accurate tracking by overlap maximization." Proceedings of the IEEE Conference on Computer Vision and Pattern Recognition. 2019. (Year: 2019).*

Farhadi, Ali, Ian Endres, and Derek Hoiem. "Attribute-centric recognition for cross-category generalization." 2010 IEEE Computer Society Conference on Computer Vision and Pattern Recognition. IEEE, 2010. (Year: 2010).*

Extended European Search Report, dated Jan. 14, 2020, for European Patent Appl. No. 19207364.1, 8 pages.

Li, Y. et al., "Pixel Offset Regression (POR) for Single-shot Instance Segmentation," 2018 15th IEEE International Conference on Advanced Video and Signal Based Surveillance, pp. 1-6, Nov. 27, 2018.

Long, S. et al., "Scene Text Detection and Recognition: The Deep Learning Era," ARXIV.org, Cornell University Library, 20 pages, Nov. 27, 2018.

Zhou, X. et al., "Bottom-up Object Detection by Grouping Extreme and Center Points," ARXIV.org, Cornell University Library, Jan. 23, 2019.

Liu, W. et al., "SSD: Single Shot Multibox Detector," 17 pages, Dec. 2015, retrieved Feb. 28, 2019 from https://arxiv.org/pdf11512.02325.pdf.

Neubeck, A. et al., "Efficient Non-Maximum Suppression," 6 pages, 2006, *18th International Conference on Pattern Recognition (ICPR '06)*, retrieved Feb. 28, 2019 from http://www.vision.ee.ethz.ch/publications/papers/proceedings/eth_biwi_00446.pdf.

Rothe, R. et al., "Non-Maximum Suppression for Object Detection by Passing Messages between Windows," 16 pages, *ETHzürich Research Collection*, 2014, retrieved Feb. 28, 2019 from https://www.research-collection.ethz.ch/bitstream/handle/20.500.11850/89883/eth-46736-01.pdf?sequence= 1.

* cited by examiner

OBJECT DETECTION AND CANDIDATE FILTERING SYSTEM

BACKGROUND

Neural networks may detect objects in an image by identifying changes in the image features and then predicting bounding boxes that encompass the various objects, such as people, within the image. The bounding boxes may indicate how many different people are identified in the image. However, the output from a neural network may include hundreds or thousands of variations on bounding boxes for each object in the image.

Non-maximum suppression (NMS) or some other combination algorithm may be used to identify a final bounding box for each object based on a comparison of the thousands of candidate bounding boxes for each object. However, this box-by-box comparison to identify a final bounding box requires a great deal of processing power and time. This slows down system functionality and reduces throughput, thereby creating system and processing back logs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing object detection and candidate filtering.

Figure 1:
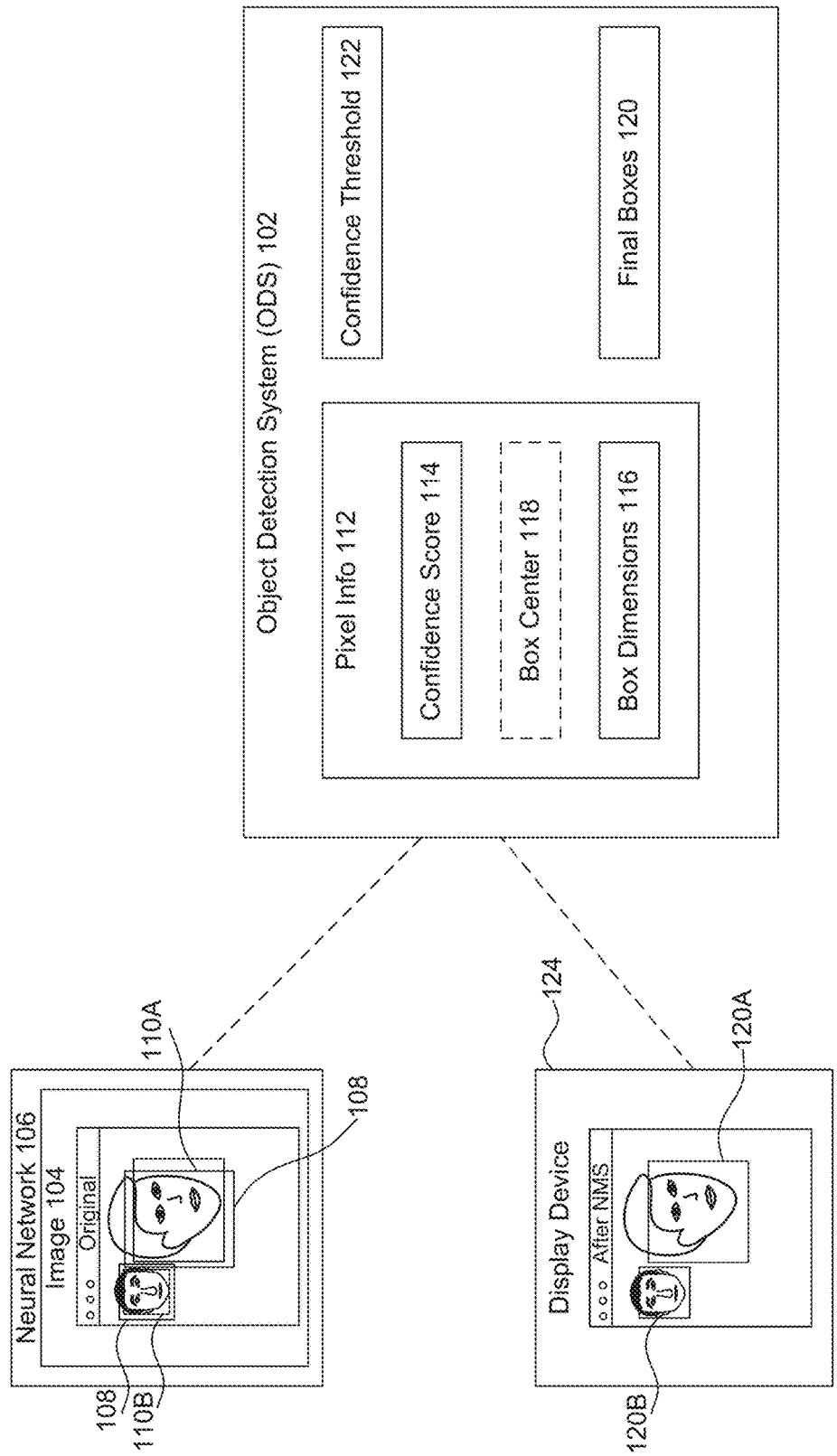
FIG. 1 is a block diagram illustrating example functionality for providing an object detection and candidate filtering system, according to some embodiments.

FIG. 1 is a block diagram 100 illustrating example functionality for providing an object detection and candidate filtering system, according to some embodiments. An object detection system (ODS) 102 may increase system throughput by reducing the processing power, memory, and number of computing cycles that would otherwise be required to identify the objects of an image 104.

In an embodiment, ODS 102 may receive information regarding a processing of image 104 from a neural network 106. For example, a user may upload image 104 to neural network 106 which may then process the uploaded image 104 as described herein, and output pixel and bounding box information regarding the image 104 to ODS 102. Neural network 106 may include a computing system that uses different machine learning algorithms, working together across one or more computing devices, to perform complex data processing tasks—generally (and in some embodiments) without being programmed with any task-specific rules.

For example, a neural network may be configured or trained to identify images of cats by analyzing images or objects that have been labeled as "cat" or "not cat". Based on this analysis, the network may dynamically generate characteristics of cats such as tails, fur, whiskers, cat-like faces, etc.

Neural network 106 may be configured to perform object identification tasks on images, by identifying the various or specified objects of an image 104. For example, an image 104 may be provided to neural network 106 which may use various machine-learning algorithms, processes, or computing devices to produce bounding boxes 108 which identify the various objects 110 in the image 104. In the example shown, two people objects 110A and 110B are identified in the image 104; however other embodiments, may include other types of object identification such as animals, locations, buildings, etc., and may include more than just two objects.

In the example of FIG. 1, image 104 is shown as including only two bounding boxes 108 for each object 110. However, in real-world applications, neural network 106 may generate any number (including thousands or tens of thousands) of bounding boxes for an object 110 in image 104. Further, each object 110 may include different numbers of generated bounding boxes 108. For example, in another embodiment, object 110A may have 100 bounding boxes 108, while object 110B has 50 bounding boxes. In an embodiment, the size of the image 104 and/or objects 110 may correspond to the number of bounding boxes 108 generated. For example, larger objects 110 within in image 104 and larger or higher resolution images 104 may include more bounding boxes.

In an embodiment, the bounding boxes 108 may not be visually displayed on the image itself 104 as they are received by OM 102. Instead, the bounding box and other output processing information from neural network 106 may be received as pixel information 112. In an embodiment, pixel information 112 may include metadata or one or more data files associated with a particular or identified image 104. Pixel info 112 may include information that indicates the locations of the various generated bounding boxes 108 for each of the various objects 110 of image 104.

In an embodiment, pixel info 112 may include information pertaining to each pixel (or an identified subset of pixels) of image 104 (at a particular, identified, or pre-defined resolution). For example, each pixel of image 104 may have or correspond to its own set of pixel info 112. The pixels may be identified based on X, Y coordinates on image 104, or may have unique pixel identifiers that indicate a location of the pixel on image 104—which may be included in pixel info 112.

Pixel info 112 may include a confidence score 114 and box dimensions 116 for each pixel for which pixel info 112 is received by ODS 102. In an embodiment, pixel info 112 may be grouped together based on to which object 108 or set of bounding boxes the pixel is associated. For example, the pixel info 112 for the pixels associated with object 110A may be grouped together, while the pixel info 112 for the pixels associated with object 110B may be grouped together.

In an embodiment, pixel info 112 for identical bounding box predictions 108 for particular objects 110 may be identified by ODS 102 and discarded to save processing resources. For example, if two different machines or processes of neural network 106 predict the same bounding box for one of the objects 110, one of the duplicates may be discarded (e.g., based on having a lower overall confidence score 114).

Confidence score 114 may indicate a confidence level with which it is estimated or predicted that a bounding box 108 encompasses the respective or identified pixel. For example, neural network 106 may estimate or predict an accuracy of each predicted bounding box 108 which may be provided as confidence score 114. For a particular bounding box 108, pixels near the center of the bounding box 108 may often have a higher confidence score 114 than pixels closer to the edges or bounds of each box 108.

In an embodiment, a first set of one or more machines of neural network 106 may output an image 104 with a single predicted or estimated bounding box 108 around a particular object 110. The machines may also generate confidence score 114 for each pixel of the image 104. The confidence score 114 may indicate a confidence that a bounding box 108 should be generated around a respective pixel. Thus pixels near the center of an image 110, as described in further detail below may include bounding boxes 108. In another embodiment, confidence score 114 may indicate a confidence with which the respective pixel is estimated to be part of the identified object 110 of image 104 or within the identified bounding box 108.

As used herein, object identification is primarily used to refer to distinguishing between different objects of a particular image 104. For example, consider the case where the image 104 may include two different cars. In some embodiments, further processing may be performed (after the objects have been identified) to classify the car objects that were identified, Such classification may include determining the make, model, year, color, dimensions, etc. of the car objects.

Box dimensions 116 may indicate a length, width, and location of a predicted bounding box 108 associated with a particular output of neural network 106. Each output may include one predicted set of bounding boxes 108 for a particular scan or processing of image 104. For example, in the illustrated example of FIG. 1, neural network may include two outputs for image 104, in which each output includes two bounding boxes 108 (one associated with each person object 110A, 110B of image 104). Or for example, neural network 106 may provide four outputs, in which each output includes only one bounding box 104 for an object 104 that has been identified for image 104.

However as indicated above, neural network 106 may provide hundreds or thousands (or more) of different outputs (e.g., predicted bounding boxes 108 for objects 110 of image 104). In an embodiment, ODS 102 may receive pixel info 112 pertaining to an aggregation of the possible bounding boxes 108 for the objects 110 identified in image 104.

Dimensions 116 may be a measure or other indication as to a size, shape, and location of the bounding boxes of image 104. For example, for a rectangular bounding box, dimensions 116 may indicate a length, width, and start location of the box. The start location may be one of the corners from which length and width are measures numbers of pixels), For a circular bounding box, dimensions may include an indication of a center of the circle or oval, or a pixel on the circumference, and a circumference measure. In other embodiments, other dimensions and shapes may be identified for various bounding boxes 108.

In an embodiment, dimensions 116 may indicate a measure (e.g., length×width) in pixels of image 104 at a particular resolution. For example, dimensions 116 may be 50 pixels×100 pixels and provide an upper left start location or identification of a particular pixel from image 104. The start location may be an upper left, upper tight, lower left, or lower right corner of the box. Then, for example, ODS 102 would be able to determine from box dimensions 116 how to draw or where a bounding box 108 is located on image 104.

In an embodiment, from box dimensions 116, ODS 102 may calculate a box center 118. Box center 118 may be the coordinates or other identifier of a particular pixel or pixels from image 104 that is the center, center point, or near the center of the respective hounding box 108 as indicated by box dimensions 116. In an embodiment, box center 118 of a particular bounding box 108 may include multiple pixels which may or may not be adjacent to one another in image 104. In an embodiment, box center 118 of a rectangular box may be equidistant (or near equidistant) to opposing box edges.

In an embodiment, an image processing system may use an algorithm or combine or process the hundreds or thousands (or more) of varying bounding boxes 108 to identify a set of final bounding boxes 120 for image 104. The final boxes 120 may include one box per object 110. In an embodiment, the final boxes 120 may be calculated or determined from the predicated boxes 108 based on their overlap. For example, non-maximum suppression (NMS) may be used to compare two overlapping predicted bounding boxes 108 and eliminate the less accurate one (e.g., based on their relative confidence scores 114).

In an embodiment, NMS may compare a first bounding box relative to an object 110A to a second, at least partially overlapping bounding box on the same object 110A. Then, for example, based on the relative confidence scores 114, an NMS processor (not shown) may discard the bounding box 108 associated with the lesser confidence scores. NMS may repeat this process over and over again for the hundreds or thousands of bounding box combinations received from a neural network 106. The goal behind NMS may be to end up with one final box 120 for each object 110A, 110B (e.g., such that none of the final boxes 120 are overlapping).

However, one of the technical challenges with NMS may be that the comparison process is a greedy algorithm that consumes substantial processing resources (e.g., memory and computing cycles). The NMS operations often have a non-linear (e.g., quadratic) relationship with the number of candidate boxes that are to be processed. For example, if the number of candidate boxes 108 for an object 110A of an image 104 is reduced from 10,000 to 5,000 (e.g., 50%), the time it takes or the resources consumed by NMS in processing the candidate may be reduced from a measure of 100 to a measure of 25 (e.g., greater than the percentage reduction in candidates). In another embodiment, NMS may include a linear relationship with the candidate boxes, but may include a quadratic or non-linear relationship to the number of processing cycles consumed.

NMS may be provided as an exemplary processing technique which may be used to reduce, combine, or identify final boxes 120. However, other embodiments may include other processing/bounding box processing or combination techniques to identify final boxes 120.

Rather than submitting the thousands of different candidate outputs (e.g., predicting bounding box 108 combinations) to NMS directly, ODS 102 may perform a filtering operation prior to submitting candidate bounding boxes 108 to NMS or other processing platform. By performing the filtering operations described herein, ODS 102 may improve operational speed and consume fewer processing resources than would otherwise be required with a direct submission of the candidate outputs from neural network 106 to NMS without prior filtering. Also the filtering operation may use fewer resources relative to NMS.

Using the filtering operations described herein, ODS 102 may reduce the number of candidate outputs (e.g., combinations of predicted bounding boxes 108 output by neural network 106) submitted to NMS. As an example of the scale of reduction in an embodiment, ODS 102 may reduce the number of candidates from 10,000 to 10. This reduction for a single object may greatly improve system throughput because the filtering operations for reducing the candidates from 10,000 to 10 require fewer processing resources than would be required for NMS to perform the comparison operation to reduce the candidates from 10,000 to 10. However, ODS 102 may perform similar filtering operations for each of the identified objects 110 of image 104, thus further improving performance.

In an embodiment, after the filtering is applied to reduce the candidates, the remaining candidates may then be processed using NMS or another process to produce a set of final boxes 120 (e.g., which may include its own box dimensions to indicate a location, size, and shape of the final boxes 120 on image 104 at a particular or identified resolution) This processing may be performed for each identified object of an image, and may increase performance results in dense images with lots of closely located objects.

In an embodiment, ODS 102 may perform confidence filtering. To reduce the processing resources (e.g., computing cycles, memory, etc.), ODS 102 may filter the pixels of image 104 based on their confidence score 114. As indicated above, confidence score 114 may indicate a confidence that a bounding box 108 should be generated around a respective pixel of an object 110 of image 104.

ODS 102 may apply a confidence threshold 122 to filter out any pixels that do not satisfy confidence threshold 122. For example, confidence threshold 122 may be set to 0.50 or 50% such that pixels with confidence scores 114 less than 50% are not further processed by ODS 102, and are discarded. In some embodiments, pixel information 112 for pixels that do not satisfy confidence threshold 122 may be deleted or otherwise removed (thus freeing up memory resources that would otherwise be required in maintaining the pixel info 112 that is no longer required for further processing).

In another embodiment, confidence filtering may be performed by neural network 106, such that only pixel information 112 for those pixels that satisfy confidence threshold 122 is received by ODS 102 thus consuming less bandwidth in the transmission of less data, and consuming fewer resources on ODS 102. Once confidence filtering is performed (by neural network 106, ODS 102, or another machine or process) and a subset of pixel info 112 satisfying (meeting/exceeding) confidence threshold 122 is identified, ODS 102 may perform centering filtering operations.

Figure 2A:
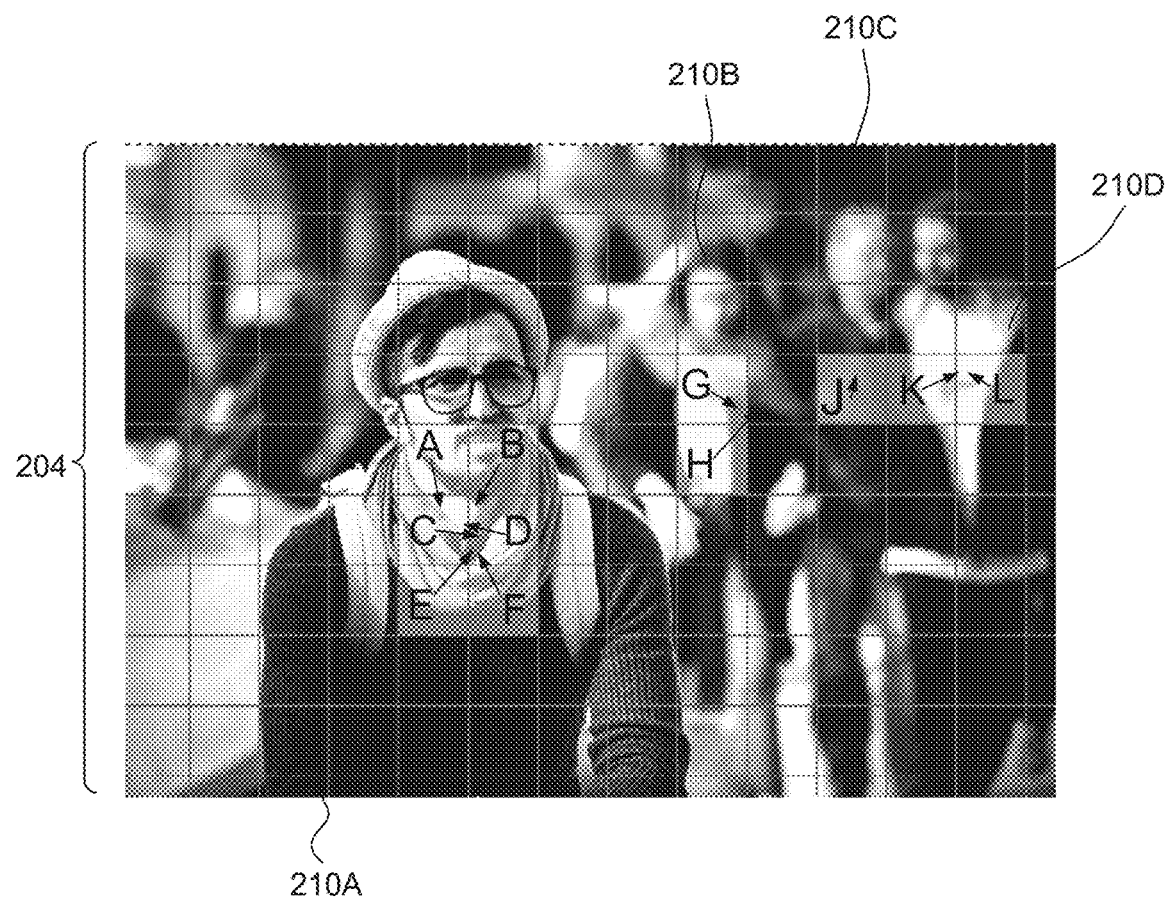
FIGS. 2A and 2B illustrate example operations related to performing centering filtering in an object detection and candidate filtering system, according to some example embodiments.
Figure 2B:
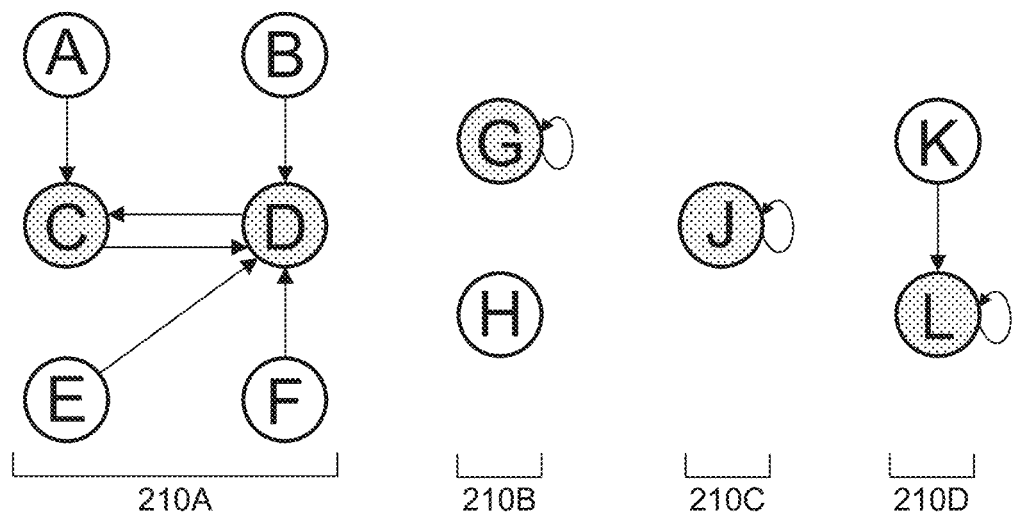

FIGS. 2A and 2B illustrate example operations related to performing centering filtering in an object detection and candidate filtering system, according to some example embodiments.

In performing centering filtering operations, ODS 102 may identify those pixel(s) that are the closest to the predicted center of the various objects 210A-D of an image 204. By identifying the centermost pixels of each predicted object 210, ODS 102 may limit the number of candidate bounding boxes to be processed by NMS to only those bounding boxes corresponding to the centermost pixels of each object 210A-D.

FIG. 2A illustrates an example display representative of the operations performed by ODS 102, in some embodiments. In practice, ODS 102 may not generate the actual pixel boxes and arrows images shown FIG. 2A, but may perform processing that is represented by these described features.

In the example of FIG. 2A, the lettered pixels A-L may correspond to those pixels whose confidence score 114 meets or exceeds confidence threshold 122. The arrows indicate a predicted center for a bounding box for that particular pixel. For example, a bounding box may include tens, hundreds, or thousands of pixels. Each pixel may indicate a confidence score 112 with regard to its inclusion within the bounding box (such that edge pixels may have lower confidence scores than more centered pixels). In an embodiment, border pixels (e.g., near the edge of an image 110) may include a low or zero confidence.

The corresponding bounding box for each pixel may have a unique center (e.g., box center 118) because different predicted bounding boxes for different pixels may not be the exact same size, shape, and/or location for a particular image.

The bounding boxes are not illustrated in the example of FIG. 2A. However, the arrows may illustrate where the box center 118 is for the bounding box of each lettered pixel is located. For example, the box center 118 of the bounding box for pixel A may be pixel C. The box center 118 of the bounding box for pixel J may be itself, and the box center 118 of the bounding box for pixel H may be an unlettered pixel next to G (e.g., whose confidence score did not satisfy confidence threshold 122), While the arrows shown may indicate a neighboring or touching box to be its box center, in other embodiments, the box centers may be separated by any different number of pixels. For example, the box center 118 of pixel A may be pixel F.

In an embodiment, as part of the centering filtering process, ODS 102 may iteratively remove pixels to which no other pixel is pointing as a box center 118. For example, with regard to object 210A, in a first iteration, pixels A, B, E and F may be removed or filtered out from being candidates of box centers 118 since no other pixels are pointing to these pixels. In a second iteration, ODS 102 may determine that since C points to D and D points to C, both pixels are to remain. For object 210A, ODS 102 may then provide only the bounding boxes (e.g., pixel info 112) corresponding to pixels C and D for resolution by NMS, rather than the pixel info 112 for all of the pixels, or even just the pixel info 112 for the lettered pixels A-F that satisfy confidence threshold 122.

As described above, this reduction in the number of candidate bounding boxes submitted for resolution to determine final boxes 120 may result in a non-linear (e.g., quadratic) improvement in processing speed and corresponding reduction in required processing resources to determine final boxes 120.

In another embodiment, if pixel D is pointing to itself as being its own box center 118, then during the second iteration, ODS 102 may remove pixel C (e.g., the corresponding pixel info 112) because no remaining pixels point to C (as pixels, A, B, E, and F were already filtered out). ODS 102 may repeat this filtering process multiple times until obtaining a final subset of pixels, with each pixel including at least 1 arrow pointing to it (e.g., are indicated as the box center 118) by at least one other remaining pixel.

In an embodiment, if there was a pixel M below box E that pointed to pixel E, in the first iteration, box M would be filtered out. In the second iteration, pixel E that points to pixel D would be removed. In the third iteration, it may be determined that pixel D remains because pixel C still points to pixel D.

As illustrated, pixel H may be pointing to a pixel without a letter (e.g., indicating it is a pixel with a low confidence score 114, that is, below confidence threshold 122). In the first iteration, box H would be filtered out. In the second iteration, the unmarked box would be filtered out because pixel G is pointing to itself.

In an embodiment, ODS 102 may require that at least one pixel or bounding box is submitted for each object 210 of an image 204. If pixel G also pointed to the unlettered pixel, then different embodiments may result in different pixels being submitted for NMS processing. In an embodiment, the first iteration may result in a determination that the only remaining box is unlettered (e.g., does not satisfy confidence threshold 122) and as such those remaining lettered pixels G and H that satisfy confidence threshold 122 may be provided for NMS processing. In another embodiment, the unlettered box with low confidence may be provided to NMS for processing.

In another embodiment, the minimum number of arrows may be increased beyond 1, which may have the effect of filtering out less prominent objects (e.g., such as object 210C) from the image 104.

FIG. 2B illustrates an example of how the lettered pixels of FIG. 2A may be filtered by ODS 102, according to an embodiment. For each object 210, a bounding box corresponding to one or more centering pixels may be returned. For example, for image 210A, pixels C and D may be returned for further processing (e.g., NMS processing). For image 210B, pixel G may be returned for further processing. For image 210C, pixel J may be returned for further processing. For image 210D, pixel L may be returned for further processing. These pixels may be submitted to NMS or another processing system to determine the final boxes 120 for each object 210.

Returning to FIG. 1, final box 120A may be the output of ODS 102, which combines or processes the bounding boxes 108 of image 110A, while final box 120B may represent the output from processing the bounding boxes 108 of image 110B. In an embodiment, the image including the objects 110A and 110B with final boxes 120A and 120B, respectively, after NMS processing may be provided for display on a user device 124. Device 124 may include a mobile device, laptop, television, or other computing device.

Figure 3:
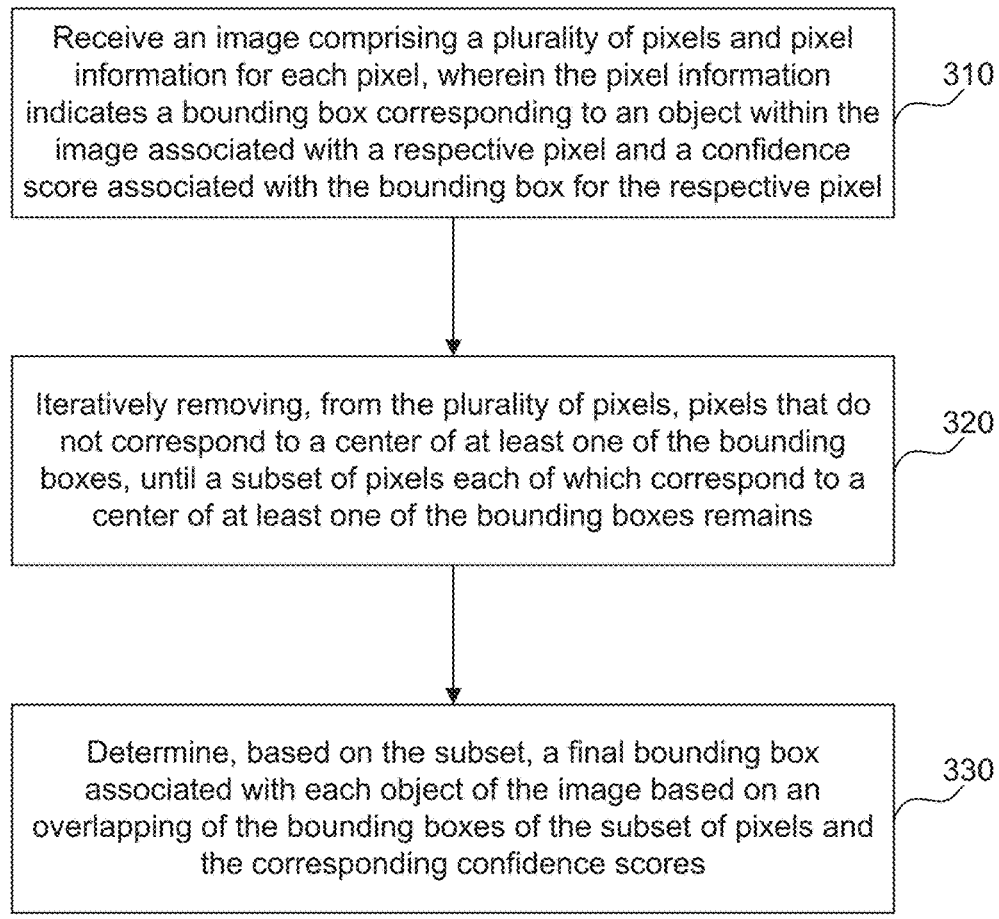
FIG. 3 is a flowchart illustrating example operations of a an object detection and candidate filtering system, according to some embodiments.

FIG. 3 is a flowchart 300 illustrating example operations of an object detection and candidate filtering system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, an image comprising a plurality of pixels and pixel information for each pixel is received, wherein the pixel information indicates a bounding box corresponding to an object within the image associated with a respective pixel and a confidence score associated with the bounding box for the respective pixel. For example, ODS 102 may receive pixel info 112 about the pixels of image 104. Pixel info 112 may include confidence scores 114 and box dimension information 116, and box center information 118 may be received or otherwise computed or derived from box dimensions 116.

In 320, pixels that do not correspond to a center of at least one of the bounding boxes are iteratively removed until a subset of pixels each of which correspond to a center of at least one of the bounding boxes remains. For example, as illustrated in the example of FIG. 2A, in a first iteration, pixels A, B, E, and F may be removed as they do not correspond to a box center 118. In other embodiments, multiple iterations may be performed until at least one pixel remains for each object 210A-D, or each remaining pixel is pointed to as the box center 118 by another remaining pixel.

In 330, a final bounding box associated with each object of the image based on an overlapping of the bounding boxes of the subset of pixels and the corresponding confidence scores is determined. For example, after identifying a set of candidate boxes, NMS processing may be performed and a set of final boxes 120 may be generated. The final boxes 120 may be provided for output or display on a device 124.

Figure 4:
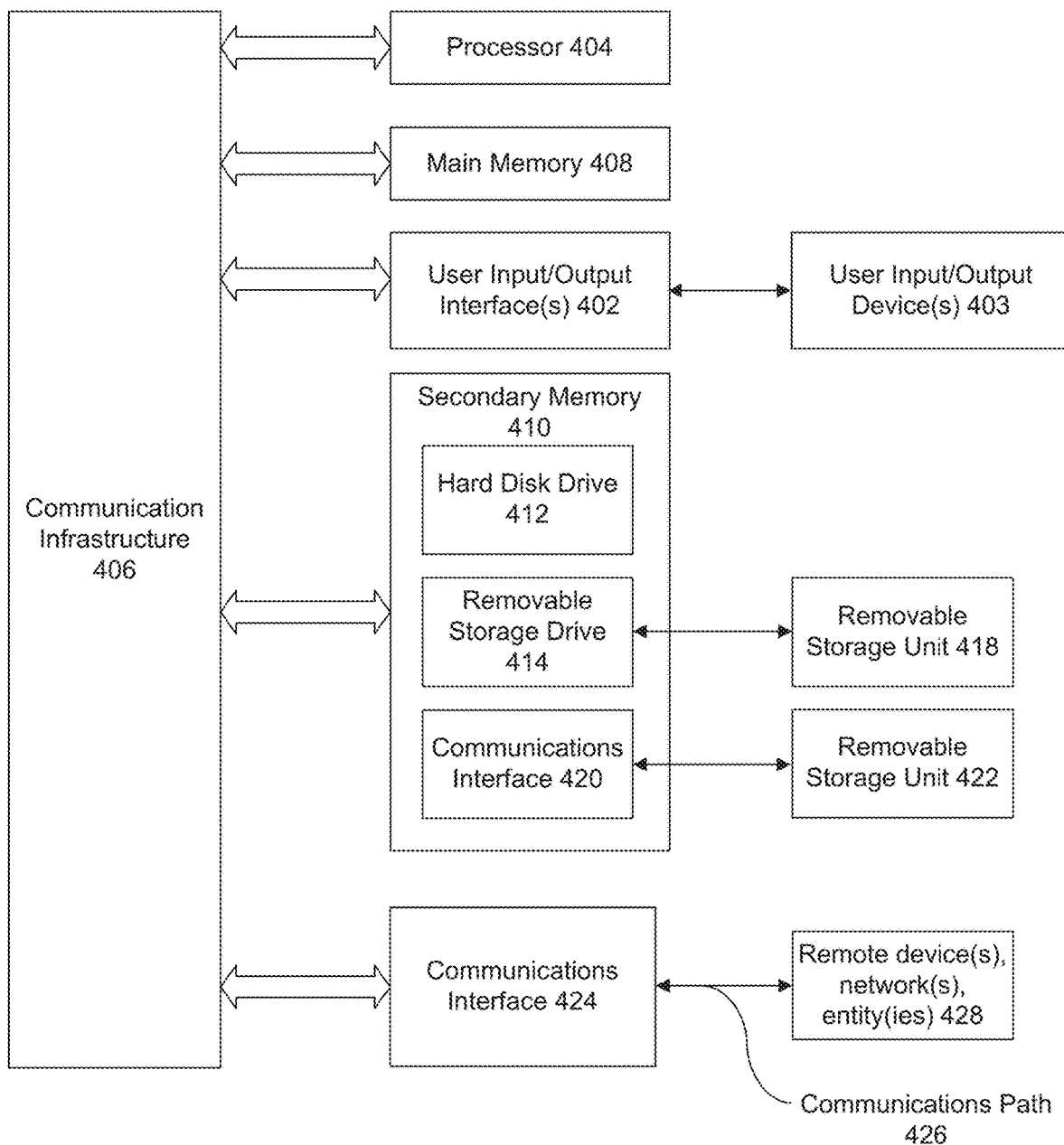
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:

receiving an image comprising a plurality of pixels and pixel information for each pixel, wherein the pixel information indicates a bounding box corresponding to an object within the image associated with a respective pixel and a confidence score associated with the bounding box for the respective pixel;

determining, from the plurality of pixels, a threshold set of pixels wherein the confidence score of each of the pixels of the threshold set of pixels exceeds a confidence threshold;

iteratively removing, from the threshold set of pixels, pixels that do not correspond to a center of at least one of the bounding boxes, until a subset of pixels each of which correspond to the center of at least one of the bounding boxes remains;

determining the center of each of the bounding boxes, wherein the center points to one of the plurality of pixels;

determining that at least one of the plurality of pixels that is the center of one of the bounding boxes has a confidence score less than the confidence threshold and is included in the subset of pixels; and determining, based on the subset of pixels, a final bounding box associated with each object of the image based on an overlapping of the bounding boxes of the subset of pixels and the associated confidence scores.

2. The method of claim 1, further comprising:

determining that the center of a first one of the bounding boxes corresponding to a first one of the plurality of pixels points to itself as being the center.

3. The method of claim 1, wherein the image and the pixel information is received from a neural network of computing devices.

4. The method of claim 1, wherein the pixel information indicating the bounding box comprises a length, width, and location of the bounding box on the image.

5. The method of claim 1, further comprising:

providing the image for display on a computing device wherein the provided image includes the final bounding boxes associated with each object of the image.

6. A system comprising:

a memory; and at least one processor coupled to the memory and configured to:

receive an image comprising a plurality of pixels and pixel information for each pixel, wherein the pixel information indicates a bounding box corresponding to an object within the image associated with a respective pixel and a confidence score associated with the bounding box for the respective pixel;

determine, from the plurality of pixels, a threshold set of pixels wherein the confidence score of each of the pixels of the threshold set of pixels exceeds a confidence threshold;

iteratively remove, from the threshold set of pixels, pixels that do not correspond to a center of at least one of the bounding boxes, until a subset of pixels each of which correspond to the center of at least one of the bounding boxes remains;

determine the center of each of the bounding boxes, wherein the center points to one of the plurality of pixels;

determine that at least one of the plurality of pixels that is the center of one of the bounding boxes has a confidence score less than the confidence threshold and is included in the subset of pixels; and determine, based on the subset of pixels, a final bounding box associated with each object of the image based on an overlapping of the bounding boxes of the subset of pixels and the associated confidence scores.

7. The system of claim 6, wherein the at least one processor is further configured to:

determine that the center of a first one of the bounding boxes corresponding to a first one of the plurality of pixels points to itself as being the center.

8. The system of claim 6, wherein the image and the pixel information is received from a neural network of computing devices.

9. The system of claim 6, wherein the pixel information indicating the bounding box comprises a length, width, and location of the bounding box on the image.

10. The system of claim 6, wherein the at least one processor is further configured to:

provide the image for display on a computing device wherein the provided image includes the final bounding boxes associated with each object of the image.

11. A non-transitory computer-readable device having instructions stored thereon that, when executed by at least one computing device, cause the at least one computing device to perform operations comprising:

receiving an image comprising a plurality of pixels and pixel information for each pixel, wherein the pixel information indicates a bounding box corresponding to an object within the image associated with a respective pixel and a confidence score associated with the bounding box for the respective pixel;

determining, from the plurality of pixels, a threshold set of pixels wherein the confidence score of each of the pixels of the threshold set of pixels exceeds a confidence threshold;

iteratively removing, from the threshold set of pixels, pixels that do not correspond to a center of at least one of the bounding boxes, until a subset of pixels each of which correspond to the center of at least one of the bounding boxes remains;

determining the center of each of the bounding boxes, wherein the center points to one of the plurality of pixels;

determining that at least one of the plurality of pixels that is the center of one of the bounding boxes has a confidence score less than the confidence threshold and is included in the subset of pixels; and determining, based on the subset of pixels, a final bounding box associated with each object of the image based on an overlapping of the bounding boxes of the subset of pixels and the associated confidence scores.

\* \* \* \* \*